J. H. GLAUBER.
INDEX FOR FAUCETS.
APPLICATION FILED SEPT. 3, 1907.

922,576.

Patented May 25, 1909.

ATTEST.
E. M. Fisher
F. C. Mussun.

INVENTOR.
JOSEPH H. GLAUBER

BY Fisher & Moser ATTYS

UNITED STATES PATENT OFFICE.

JOSEPH H. GLAUBER, OF CLEVELAND, OHIO.

INDEX FOR FAUCETS.

No. 922,576. Specification of Letters Patent. Patented May 25, 1909.

Application filed September 3, 1907. Serial No. 391,149.

*To all whom it may concern:*

Be it known that I, JOSEPH H. GLAUBER, a citizen of the United States, residing at Cleveland, in the county of Cuyahoga and State of Ohio, have invented certain new and useful Improvements in Indexes for Faucets, and do declare that the following is a full, clear, and exact description of the invention, which will enable others skilled in the art to which it appertains to make and use the same.

My invention relates to an index for faucets, basin-cocks and the like, and the object of the invention is to provide an index for a faucet, cock, or valve which will disclose to a user at a glance the kind or character of liquid a particular faucet or cock represents, such as hot or cold water, if it be used for water, or for any other liquid, and which index or device is a wholly independent and separate article of manufacture and does not constitute an essential part of the article with which it is associated.

Figure 1:
Figure 2:
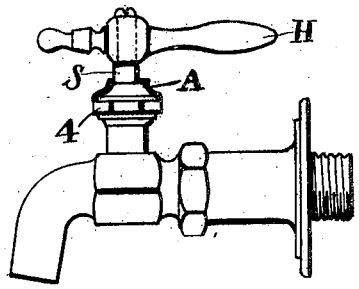
Figure 3:
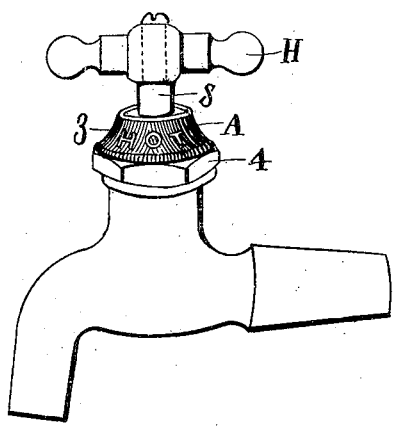
Figure 4:
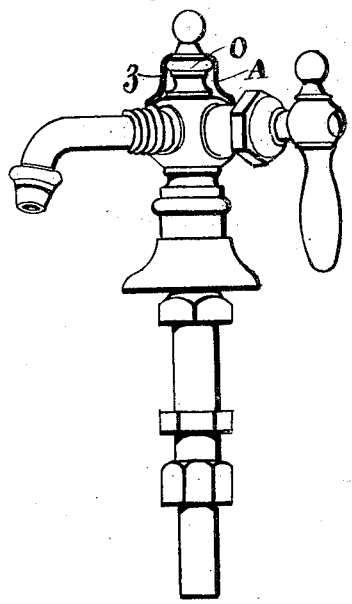
Figure 5:
Figure 6:
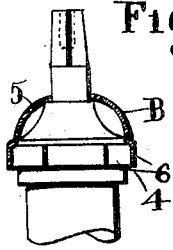

In the accompanying drawings, Figure 1 is a perspective view of the index alone, as a separate article of manufacture and sale and which is variously adapted for use with cocks and faucets as indicated in Figs. 2, 3 and 4, which represent three different styles of faucets having said index engaged thereon. Figs. 5 and 6 represent a perspective view and a sectional view respectively, of a modified form of index member adapted to sleeve upon the nut of the faucet to lock the said member against independent rotation.

The said index or device is intended to be freely and removably mounted on a faucet or cock more or less after the manner shown in the foregoing views or in any other practical and available place or manner thereon, so as to be fully and plainly exposed. In said views the device is substantially of thimble shape, and in Figs. 2 and 3 is engaged about the stem S of the faucet beneath removable handle H, while in Fig. 4 it is engaged on or over the central top ornamentation O of the faucet standard. As for that matter it might be placed in any other position where it will have direct association with the member or part which it is intended to indicate, whether for hot or cold water, or for some other kind of liquid, such for example as is usually kept in cans or barrels in groceries and the like. The said index A may be made of china, porcelain, metal, plain or enameled, and the designating words or characters thereon may be printed, molded, stamped, or otherwise produced or applied. The shape of the article likewise may be varied from the thimble pattern shown, and by reason of being more or less ring shaped with opening —2— through the same, is adapted to be placed on the faucet or cock and held there until purposely removed. About its sides a surface —3— fashioned to imprint characters or words thereon, such as "Hot" or "Cold", to indicate the fluid. However, the indications or characters may be placed on any available portion of the device so as to be plainly visible, the essential characteristics of the article being that it is distinct and separate from the faucet or cock and is not a constituent part thereof in any sense but merely adapted to be placed on any standard faucet and cock as it is found in the market or in use and removable at pleasure by the user without the aid of a plumber or tools, unless it be an ordinary screw driver or wrench to take off a faucet handle. Hence this article is essentially an independent device adapted to be placed upon an otherwise finished article and removed at pleasure, and the words are designed to be so placed thereon that however it is turned they will be available. Thus, the word "Hot" can be repeated two or more times around the side thereof and be visible from any point of view.

In Figs. 5 and 6 I show a modified form of index member B which has a convexly rounded portion 5 with a flange 6 at its bottom shaped to sleeve over the nut 4 as used on faucets generally. The index characters on this member may be duplicated on opposite sides thereof or may have different characters, say hot and cold, as shown.

A member so constructed may be used on either a hot or cold faucet by placing the proper characters which designate the kind of a faucet in front, and the other would be to the rear and out of view.

Locking flange 6 prevents rotation of the member and always holds it place, as shown.

What I claim is:—

1. As a new article of manufacture and sale, an index attachment for cocks, faucets, and the like, comprising an endless band of cup shape having edge portions adapted to sleeve over and fit different cylindrical portions of the cock to provide a stationary crown piece therefor and having indicating characters thereon to designate the fluid to be drawn from the cock.

2. An index for cocks, faucets and the like consisting of an endless ring, concavo-convex in cross section, having its respective ends engaged with and resting freely upon different portions of the cock or faucet and independent of the handle and stem and provided with characters to indicate the kind of fluid drawn from the cock.

3. An index member for cocks, faucets or the like comprising a free bell shaped member adapted to sleeve upon some portion of the cock and having different designating characters on different portions thereof and constructed at its bottom to have sleeved locking engagement with the cap nut of the cock to prevent rotation.

4. As an article of manufacture and sale, an index member for cocks, faucets and the like, comprising a tubular thimble of bell shape having an inturned flange at its top and index characters on its flaring band portion and adapted to slip over and be freely mounted upon a vertical portion of the cock.

5. As an article of manufacture and sale, an index member adapted for universal application to varying kinds and styles of faucets having cap nuts, comprising a thimble having an opening at its top and constructed in its body portion to conform with and to sleeve upon the cap nut of the faucet.

6. A cock, faucet, or the like having a valve stem and a cap nut with an annular curved extension engaged about the same, in combination with an index member of bell shape adapted to have sleeved engagement with said nut extension to rest thereupon loosely and in a stationary position irrespective of the operation of the stem and said index member provided with index characters on its face.

In testimony whereof I sign this specification in the presence of two witnesses.

JOSEPH H. GLAUBER

Witnesses:
R. B. MOSER,
E. M. FISHER.